US011054968B2

(12) United States Patent
Floury

(10) Patent No.: US 11,054,968 B2
(45) Date of Patent: Jul. 6, 2021

(54) METHOD AND A DEVICE FOR MANAGING A PLURALITY OF MESSAGES SIMULTANEOUSLY

(71) Applicant: Orange, Paris (FR)

(72) Inventor: Cédric Floury, Perros Guirec (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/583,769

(22) Filed: May 1, 2017

(65) Prior Publication Data

US 2017/0315685 A1    Nov. 2, 2017

(30) Foreign Application Priority Data

May 2, 2016   (FR) ...................................... 1653953

(51) Int. Cl.
*G06F 3/0482*    (2013.01)
*G06F 3/0488*    (2013.01)
(Continued)

(52) U.S. Cl.
CPC .......... *G06F 3/0482* (2013.01); *G06F 3/0233* (2013.01); *G06F 3/0485* (2013.01); *G06F 3/04886* (2013.01); *G06F 40/166* (2020.01); *H04L 51/04* (2013.01); *H04M 1/7243* (2021.01); *H04M 1/72436* (2021.01); *G06F 2203/04803* (2013.01)

(58) Field of Classification Search
CPC .. G06F 3/0233; G06F 3/0485; G06F 3/04886; G06F 3/0482; G06F 40/166; G06F 2203/04803; H04L 51/04; H04M 1/72547; H04M 1/72552; H04M 1/7243; H04M 1/72436
See application file for complete search history.

(56) References Cited

U.S. PATENT DOCUMENTS

2004/0268263 A1    12/2004   Van Dok et al.
2005/0052434 A1*    3/2005   Kolmykov-Zotov ........................
                                                     G06F 3/0416
                                                     345/179
(Continued)

FOREIGN PATENT DOCUMENTS

EP    2244430 A1    10/2010
EP    2571234 A1    3/2013

OTHER PUBLICATIONS

Preliminary Search Report dated Dec. 22, 2016 for French Application No. FR 1653953 filed May 2, 2016.

*Primary Examiner* — Kyle R Stork
(74) *Attorney, Agent, or Firm* — Knobbe, Martens, Olson & Bear, LLP

(57) ABSTRACT

A method of managing a plurality of messages simultaneously, each message having at least one destination, is disclosed. In one aspect, each of the messages is capable of being edited in a selected input zone dedicated to that message, where each of the zones are shown as being a portion of a common container. The management of one of the messages includes dynamically creating an input zone associated with the message in the container, selecting the created zone, and editing the message in the selected zone, where sending the message to its at least one destination causes the content of the selected zone containing the message to be deleted without having any effect on the content(s) of one or more input zones dedicated to other messages.

12 Claims, 4 Drawing Sheets

(51) Int. Cl.
*G06F 3/023* (2006.01)
*G06F 40/166* (2020.01)
*H04M 1/7243* (2021.01)
*H04M 1/72436* (2021.01)
*G06F 3/0485* (2013.01)
*H04L 12/58* (2006.01)

(56) References Cited

U.S. PATENT DOCUMENTS

| | | | | |
|---|---|---|---|---|
| 2008/0183823 | A1* | 7/2008 | Valencia | G06Q 10/107 709/206 |
| 2012/0185781 | A1* | 7/2012 | Guzman | G06Q 10/107 715/752 |
| 2014/0143684 | A1* | 5/2014 | Oh | H04L 51/04 715/752 |
| 2014/0282084 | A1* | 9/2014 | Murarka | H04L 51/32 715/752 |
| 2014/0368422 | A1* | 12/2014 | Gupta | G06F 3/0304 345/156 |
| 2015/0113436 | A1* | 4/2015 | Penha | G06F 3/0481 715/752 |
| 2015/0350143 | A1* | 12/2015 | Yang | G06F 3/0482 345/173 |
| 2017/0272388 | A1* | 9/2017 | Bern | H04L 51/046 |

* cited by examiner

METHOD AND A DEVICE FOR MANAGING A PLURALITY OF MESSAGES SIMULTANEOUSLY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. In particular, the disclosure of French Patent Application FR 1653953, filed May 2, 2016, is incorporated herein by reference in its entirety.

BACKGROUND

Technical Field

Embodiments described herein lie in the general field of messaging systems.

Description of the Related Art

Embodiments described herein relate more particularly to managing a plurality of messages simultaneously that are for sending to one or more destinations.

Telephone users, and in particular users of smartphones, often exchange messages with their contacts via messaging services (SMS or dedicated applications). In particular, the widespread use of telephones means that the number of messages exchanged is potentially high, and it is not always simple for a user to follow the thread of a conversation.

Among the problems that are encountered in the use of messaging services, the problem of "crossed messages" is very frequent. It can happen that while a user A is preparing a message for a contact B, that same contact B sends a message to the user A at that time. Under such circumstances, the message being prepared by user A may no longer be appropriate, or else user A may desire to begin by answering the message most recently received from contact B before carrying on with preparing the initial message.

By way of illustration, in the state of the art, two users A and B may find themselves in the following situation:

User A sends a first message to user B: "Are you going to the match this evening?"

User B then begins to prepare a reply "I don't think so, because".

User A then sends a second message to user B "Do you know whether Eric will be there?"

If user B desires to answer the second question on its own, it is necessary to delete or copy the message that is already being prepared. Thereafter user B needs to prepare another message, and then if user B seeks to answer the first question, it is necessary either to restart the initial message and finish it, or else to paste the answer in the input zone for that message, providing it was previously copied. These operations can be found to be awkward, particularly since the associated situation arises frequently.

The embodiments described herein seek to provide a messaging application that does not present the drawbacks of the prior art.

SUMMARY

Thus, and in a first aspect, a method is provided of managing a plurality of messages simultaneously, each potentially being destined for at least one destination, each of the messages being edited in a selected input zone dedicated to the message, each of these zones being shown as being a portion of a common container, the management of one of these messages comprising:

a dynamic creation step for dynamically creating an input zone associated with this message in the container;

a selection step for selecting the created zone; and an editing step for editing the message in the selected zone;

the sending of the message to its destination(s) causing the content of the selected zone containing this message to be deleted without effect on the content(s) of one or more input zones dedicated to other messages.

Correspondingly, a device is provided for managing a plurality of messages simultaneously, each message potentially being destined for at least one destination, each of said messages being edited in a selected zone dedicated to the message, each of these zones being shown as being a portion of a common container, the management module for one of these messages comprising:

a dynamic creation module for dynamically creating a zone associated with this message in the container;

a selection module for selecting the created zone; and an editing module for editing the message in the selected zone;

the sending of the message to its at least one destination causing the content of the selected zone containing the message to be deleted without effect on the content(s) of one or more input zones dedicated to other messages.

A container is an element of a graphics interface in which a user can edit a content, such as text, images, or indeed video. By way of example, the user may input a text via a keyboard, possibly a physical (real) keyboard or a virtual keyboard, e.g. a touch keyboard, or the user may dictate a message via a microphone, after positioning a cursor. The user can also insert multimedia content such as images or videos, e.g. by means of other graphics elements, such as buttons. The size of the container may possibly vary. For example, it may increase when its content becomes larger (longer text, more multimedia contents, etc.).

An input zone corresponds graphically to a portion of the container or to the entire container, and the content that is dedicated thereto is for being sent within a message to at least one destination. A message is thus associated with a single input zone, and the container enables one or more messages to be input. The size and the position of an input zone is not constant within the container, and can vary as explained below. An input zone may also be caused to disappear visually from the container, but without that causing the content that is associated therewith to be deleted.

An input zone may be created dynamically, i.e. at any time, depending on the needs of the user. Such creation involves dynamically allocating memory space for storing the content input into the zone. Each input zone thus points to a memory space that is specific thereto. The size of the memory space allocated to a zone may increase dynamically with the size of the content.

Selecting an input zone has the effect of causing the content edited in that zone to be stored in the memory space dedicated to the zone. By way of example, such selection may be represented graphically by the appearance of a cursor in the input zone.

When a message associated with a certain input zone is sent, the content of that zone is deleted, but the contents of other input zones remain unchanged.

Thus, a user may advantageously edit as many messages as there are input zones in a single container, and can send each of the messages independently of the others, and in any desired order.

In other words, the contents of the messages, and in particular those that are being edited, are stored in memory and then finalized and sent on request.

In a particular implementation, the dynamic creation step and the step of selecting the zone associated with the message take place simultaneously.

Thus, on memory space being allocated simultaneously with the associated input zone appearing, the user can immediately edit a content that is to be stored therein, thus avoiding any need for additional user action.

In a particular implementation, for managing at least one message, the step of dynamically creating the zone may be performed:

as a result of an action of at least one pointer on an interface; or automatically, on opening a messaging application performing the method.

The interface may be a touch interface enabling the application performing the method to be displayed.

Thus, the user can create a new input zone by using a pointer and performing an action such as a tap or a double-tap, or sliding over the surface.

An input zone may also be created automatically on opening the application, thereby avoiding any need for the user to perform a zone-creating action, thus saving time.

In a particular implementation, at least one of the input zones may be destroyed, which destruction may be performed:

as a result of an action of at least one pointer on an interface;

automatically on sending a message associated with the zone; or automatically, on closing a messaging application implementing the method.

In a particular implementation, the step of selecting a zone comprises:

a scrolling step for scrolling the zones in the container; and a stopping step for stopping on the zone to be selected.

Scrolling input zones in the container allows the user to view them one after another, and possibly to view a plurality of zones at the same time. Stopping on one of these zones then serves to select it in order to be able to edit its content.

In a particular implementation, the scrolling step corresponds to a step of shifting the zones in the container, the shifting being performed by a sliding movement of at least one pointer on the container.

Specifically, sliding the pointer over the container causes the content of the container to scroll in the direction of the sliding movement, so as to cause the various input zones to appear. The user can thus intuitively cause the various zones to scroll in order to select one and then edit it.

In a particular implementation, the shifting is performed in the inputting direction.

By way of example, this direction may correspond to the direction for inputting characters. Shifting may take place in any direction (to the left or to the right).

In a particular implementation, the scrolling step may correspond to a step of successively displaying each of the zones in the container as a whole, with it being possible to cause the following zone to be displayed:

by at least one pointer tapping at least one virtual or real (physical) button of an interface; or by at least one pointer double-tapping on the container.

In this implementation, an input zone occupies the entire container, and the user can go from one zone to another by acting on the interface of the application performing the method. The interface may be a touch interface.

In a particular implementation, the stopping step may be performed:

by at least one pointer tapping the created zone at least once; or automatically, when the created zone occupies at least a major portion of the container.

In the first situation, by tapping the pointer on the input zone that is to be selected, the user addresses the storage space dedicated to that zone.

In the second situation, when the input zone occupies a major portion of the container, or indeed the entire container, and thus corresponds to the zone that is the most visible to the user, stopping on said zone may take place automatically, thus avoiding any need for the user to perform an additional action.

This stopping step may cause a cursor to appear in the input zone.

In a particular implementation, the pointer may include:

a finger; or a stylus.

In a particular implementation, the various steps of the method of managing a plurality of messages are determined by computer program instructions.

Consequently, the a computer program on a data medium is also provided, the program being suitable for being performed by a computer, the program including instructions adapted to performing the method as mentioned above for managing a plurality of messages.

The program may use any programming language and be in the form of source code, object code, or code intermediate between source code and object code, such as in a partially complied form, or in any other desirable form.

A computer readable data medium including a computer program as mentioned above is also provided.

The data medium may be any entity or device capable of storing the program. For example, the medium may comprise storage means, such as a read only memory (ROM), e.g. a compact disk (CD) ROM, or a microelectronic circuit ROM, or indeed magnetic recording means, e.g. a floppy disk or a hard disk.

Furthermore, the data medium may be a transmissible medium such that an electrical or optical signal that is suitable for being conveyed via an electrical or optical cable, by radio, or by other means. The program may in particular be downloaded from an Internet type network.

Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages appear on reading the following description made with reference to the accompanying drawings, in which.

DETAILED DESCRIPTION OF CERTAIN EMBODIMENTS

Figure 1:
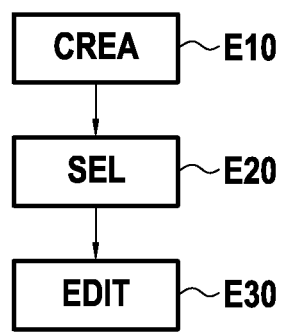
FIGS. 1 and 2 show steps of a method of managing a plurality of messages in accordance with certain implementations.

FIG. 1 shows a method for managing a plurality of messages simultaneously.

Figure 7:
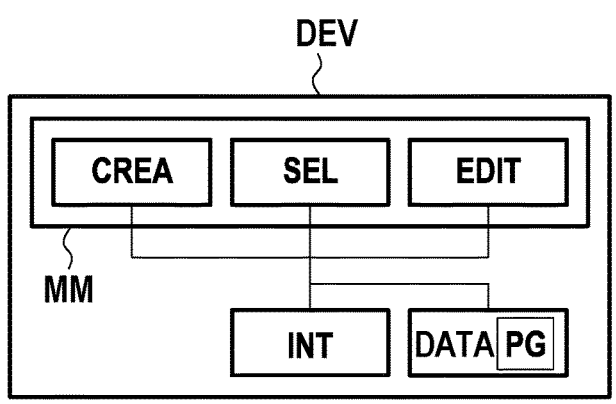
FIGS. 7 and 8 show devices for managing a plurality of messages.

The method is performed by a user device DEV shown in FIG. 7, and it comprises a first step E10 of dynamically creating an input zone Z1 in a container CONT, the input zone Z1 being associated with a message M1 or being for associating with a message M1.

The container CONT corresponds to a graphics object into which a user can input content. The content may be in the form of text, photos, or videos.

The container CONT may be displayed graphically in the form of a rectangle of size that may optionally vary as a function of the quantity of content present within it, or as a function of other parameters.

In general, the container CONT is situated close to a physical or virtual digital keyboard enabling a user to input characters. Other nearby graphics objects, such as virtual buttons, may also enable contents, such as photos or videos, to be inserted in the container, and regardless of whether they are initially stored in the memory of the telephone or acquired while editing the content.

These graphics elements may be displayed on a graphics interface INT, preferably a touch interface, of the device DEV. This interface INT displays a messaging application in accordance with embodiments described herein and performing the method of managing a plurality of messages simultaneously.

The input zone Z1 corresponds to a defined visual zone lying within the container CONT, into which it is possible to input content corresponding to a message M1. The container CONT may contain a plurality of input zones Z1, Z2.

Two input zones may be visually distinguished, e.g. by a graphics object such as a continuous line or a dashed line.

The positions of the input zones in the container may vary during the method. This variation is described below.

Creating an input zone Z1 leads to content being created for a new message M1 that can be edited in this zone.

The input zone Z1 may be created dynamically, e.g. when the user presses on a graphic object of the interface INT such as button, e.g. a "+" button or an "Add input zone" button, or indeed by moving a pointer over the interface INT, e.g. moving a finger. For example, the user may slide the pointer in the container leading to its content being shifted and leading to the appearance of a new input zone as created in this way.

The user may create one or more new input zones at will, in other words whenever the user needs one, and at any time.

It is also possible that opening the messaging application that performs the method leads to one or more input zones being created automatically and being displayed directly in the container CONT.

Creating an input zone leads to storage space dedicated thereto being allocated dynamically. Consequently, each input zone points to its own storage space.

In this implementation, such allocation takes place dynamically. Thus, each new character input by the user or each new photo or video inserted by the user is stored dynamically in the storage space dedicated to the zone.

Step E10 of dynamically creating an input zone is followed by a step E20 of selecting the zone Z1 that has been created.

The user selects the zone Z1 in which the user desires to edit content. This selection step E20 is described in detail with reference to FIG. 2.

The selection step E20 is followed by a step E30 of editing the message M1 in the previously selected zone Z1.

Once the zone Z1 has been selected, the user can then edit, input, add, or delete content in the zone.

Figure 6A:
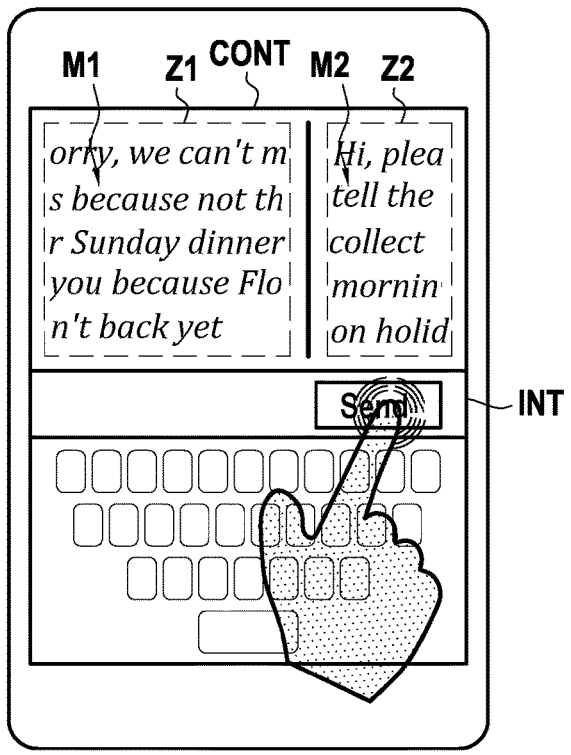
Figure 6B:
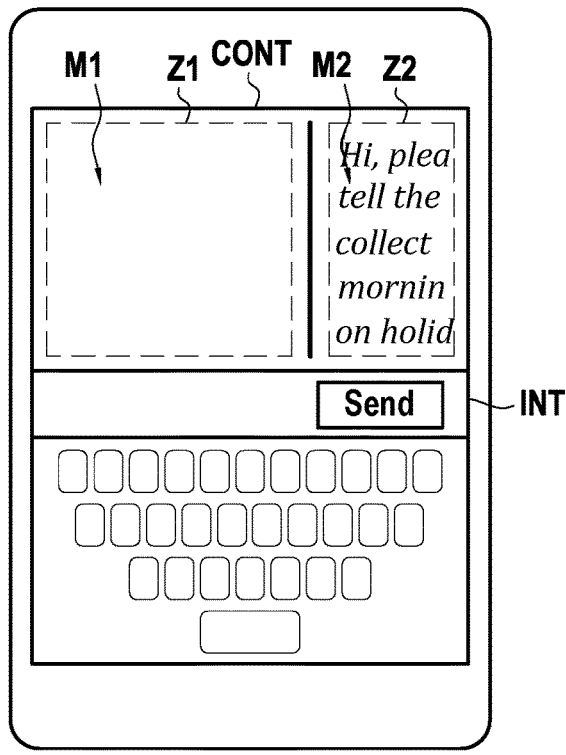

As explained above, an input zone has the particular feature of being dedicated to a single message. Thus, when sending a message M1 to a destination, e.g. by pressing a pointer on a "Send" button, only the content associated with the selected zone Z1 associated with the message M1 is deleted, while the contents of other input zones Z2 associated with possible other messages M2 remain unchanged in the container CONT, as shown in FIGS. 6A and 6B.

In a particular implementation, the step of dynamically creating and the step of selecting the zone associated with the message for sending take place simultaneously.

Thus, while allocating memory space, and simultaneously with the associated input zone appearing, focus is placed automatically in this space and the user can immediately edit content that will be stored, thus avoiding any need for the user to perform any additional action.

In this implementation, when the user creates the input zone, a cursor may appear in that zone.

In accordance with certain embodiments described herein, input zones may also be destroyed either in response to a user action or else automatically.

An input zone may be destroyed by the action of a pointer on the container, e.g. when sending a message associated with that zone, or on closing a messaging application that performs the method.

For example, the user may initiate destruction of a zone by pressing on a graphics object, such as a button, e.g. a " " button or a "Delete input zone" button, or indeed by causing a pointer to slide on the touch interface representing the application implementing the method.

For example, a downward or upward sliding movement may serve to delete the content of a zone.

The content of a zone may also be deleted automatically when sending the message associated with that zone, in which case the user has no need to perform an additional action.

The content may also be deleted automatically on closing the application that implements the method, and this characteristic may for example be an option made available to the user in the settings of the application.

Figure 2:
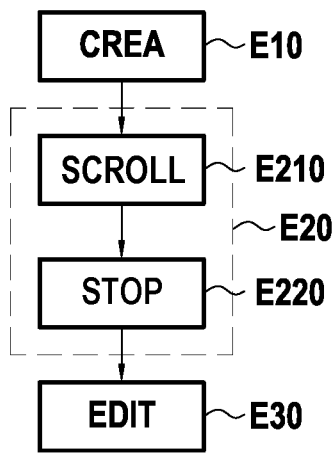

With reference to FIG. 2, there follows a description in greater detail of the various steps (E10 to E30) of a method for managing a plurality of messages.

The steps E10 and E30 of the method are similar to the steps E10 and E30 described with reference to FIG. 1.

The step E20 of selecting the zone that was created in step E10 is made up of two substeps E210 and E220.

The step E210 constitutes a step of scrolling input zones in the container.

This scrolling enables the user to view each of the contents in the various input zones Z1, Z2 one after another in order to be able to select a chosen zone. These zones Z1, Z2 and their associated messages M1, M2 may be visible simultaneously in the container CONT.

In a particular implementation, scrolling corresponds to shifting SHIFT the input zones in said content, this shift SHIFT being performed by a sliding movement of a pointer in the container CONT.

Figure 3A:
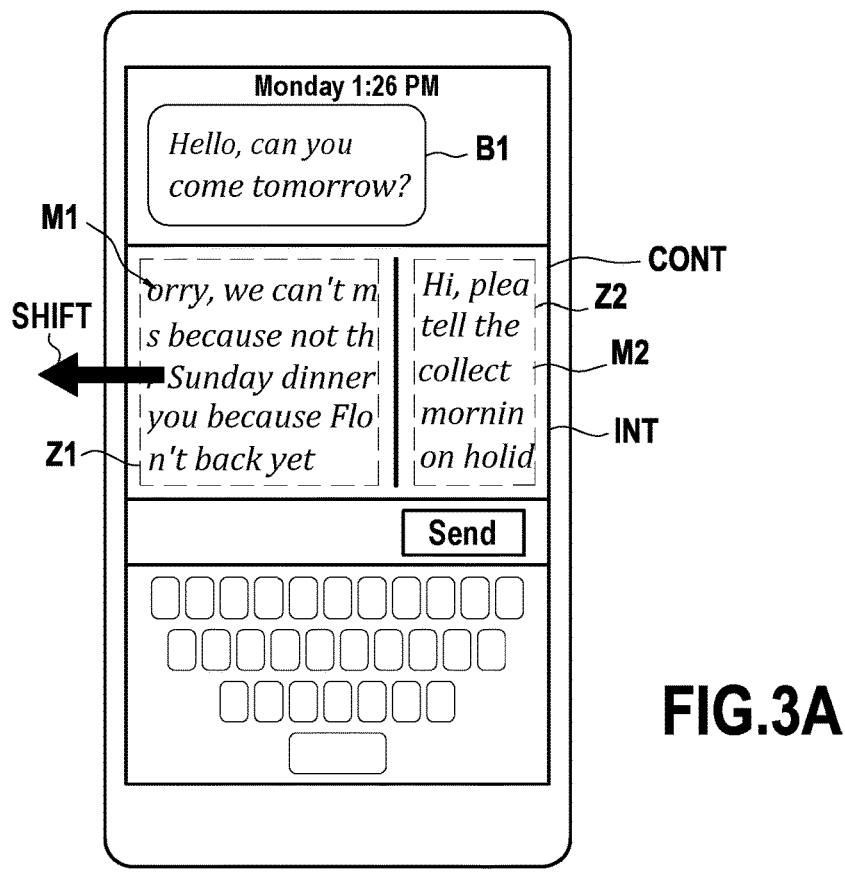
FIGS. 3A to 6B reproduce examples of the graphics displayed in an application implementing the method.
Figure 3B:
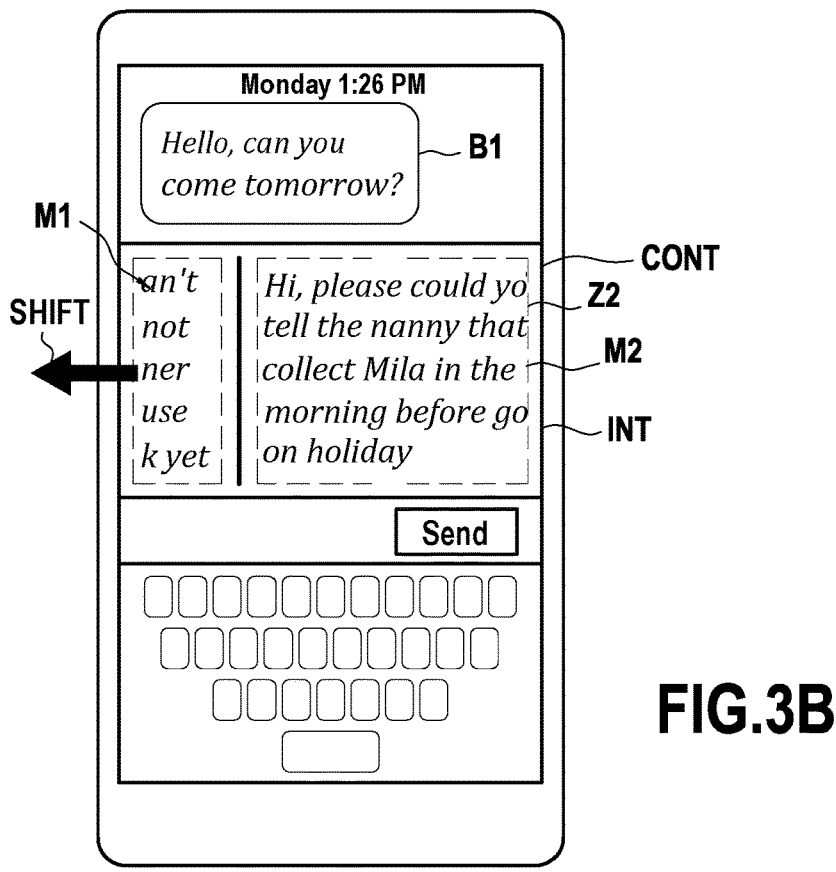

This implementation is shown in FIGS. 3A and 3B.

By way of example, the user may slide a finger over the container CONT.

In FIG. 3A, the graphics interface INT shows the application performing the method. The user can see previously-sent messages, e.g. in "bubbles" B1, a virtual input keyboard, and the container CONT containing one or more input zones Z1, Z2.

In this first FIG. 3A, two input zones Z1 and Z2 containing respective messages M1 and M2 can be seen in the container CONT. The zones Z1 and Z2 are positioned beside each other in the character input direction (horizontal in this example), and they are separated by a vertical continuous line.

The arrow SHIFT illustrates the input zones Z1, Z2 being shifted during a sliding movement of a finger or a stylus in the rectangle corresponding to the container CONT.

Such a sliding movement leads to the various zones that have been created being displayed in succession, such as for example the zone Z2 containing the message M2 that is shown in FIG. 3B.

In these figures, it can be seen that the positions and the sizes of the input zones Z1 and Z2 within the container vary during the sliding movement, as mentioned above. Specifically, the zone Z1 visually occupying the major portion of the container is subsequently replaced in part by the zone Z2.

This movement thus leads to the disappearance from view of contents in zones that are not visible in the container CONT, but does not have any impact on those contents, which are conserved in memory.

In an implementation, the number of input zones that can be created and observed need not be limited in the container.

The sliding movement is not limited in orientation or direction.

The positioning of input zones in the container is likewise not limited to the positioning shown in FIGS. 3A and 3B, and it could be different.

In another implementation, the step of scrolling the input zones corresponds to a step of displaying each of the input zones in succession in the entire container CONT.

Figure 4:
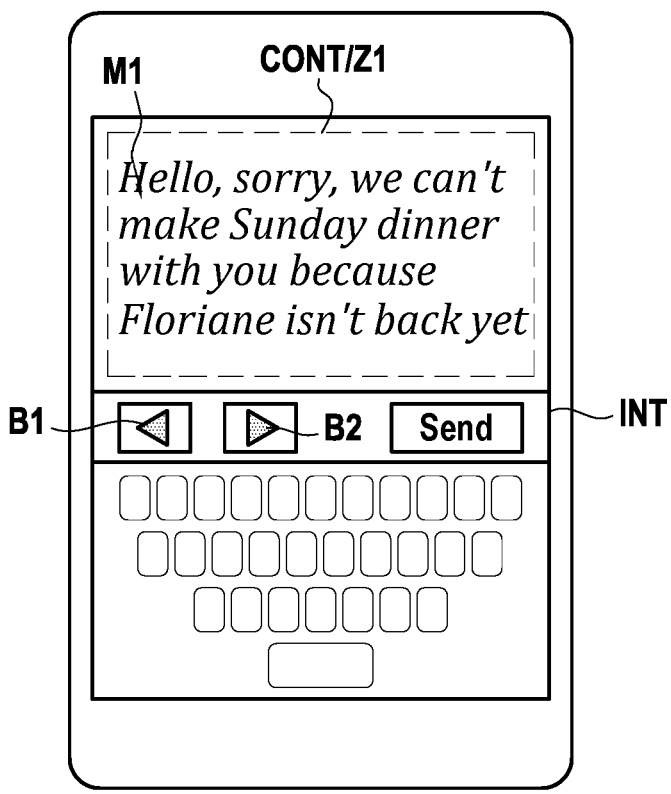
Figure 5:
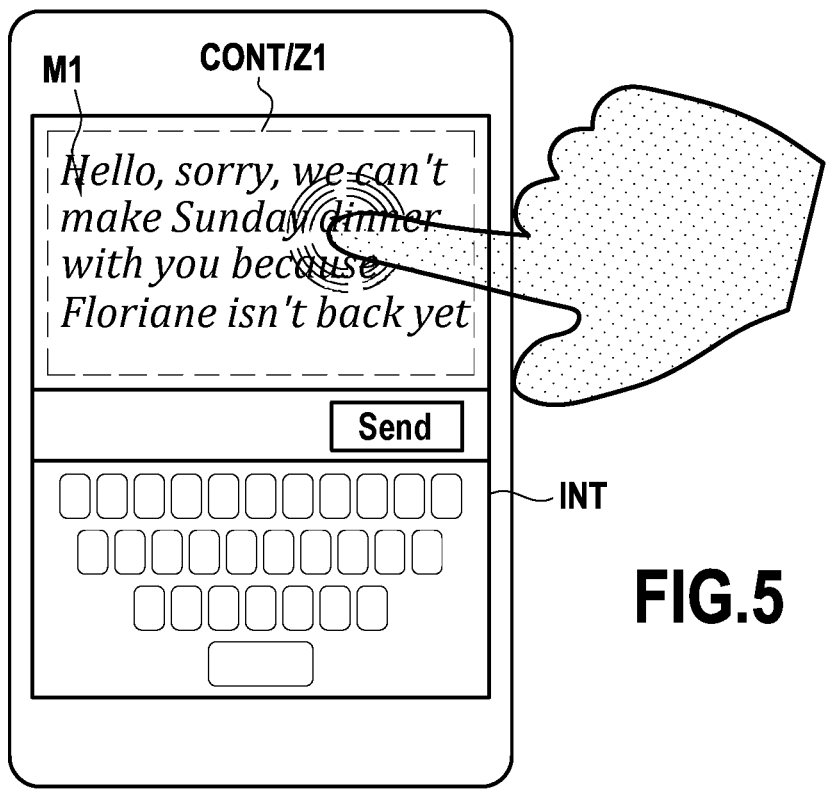

By way of example, this implementation is shown in FIG. 4 or 5.

In this implementation, only one input zone Z1 occupies the entire container CONT.

Passing from one zone to another may be done by tapping at least one pointer on one or more buttons of the touch interface. For example, and as shown in FIG. 4, the user can navigate between input zones by using buttons B1 or B2.

Passing from one zone to another may also be performed by at least one pointer double-tapping (or double-clicking) the container. This example is shown in FIG. 5. Thus, when the user double-taps the container with a stylus or with one or more fingers, the input zone Z1 associated with the message M1 disappears and is replaced by another input zone associated with another message.

The step E210 of scrolling input zones in the container is followed by a step E220 of stopping on the zone created in step E10.

This step enables the user to select one of the zones from among all of the existing zones in order to be able to edit its content.

This stopping step may be performed by at least one pointer making at least one tap on the created zone, as is common practice in a conventional messaging application, or automatically, when the created zone occupies at least a major portion of the container.

In the first option, tapping the pointer on the zone gives access to the storage space dedicated to that zone. The user can then input content that is stored directly in that space.

In the second option, when the input zone occupies the entire container, or occupies the majority of the container (and is thus visible for the most part to the user), the zone is stopped automatically, and its storage space is linked automatically. The user thus does not need to perform any additional action before inputting content.

This stopping step may give rise to a cursor appearing in the input zone, as is known in the prior art.

FIGS. 6A and 6B both show graphics of an interface INT of a device DEV associated with an application performing a method in accordance with certain embodiments described herein.

FIG. 6A corresponds to a situation before sending a message M1 contained in a zone Z1. FIG. 6B corresponds to a situation after sending the message M1.

In FIG. 6A, the contents of zones Z1 and Z2 are displayed and can thus be consulted or edited by the user.

Once the zone Z1 has been selected, and after pressing on the "Send" virtual button of the touch interface INT, the content of the zone Z1 is deleted simultaneously with the message M1 contained in that zone being sent. Nevertheless, the zone Z1 is not necessarily destroyed.

The message M2 contained in the zone Z2 remains unchanged, as shown in FIG. 6B, and the user can thus consult and edit the content of the message M2.

FIG. 7 shows a device DEV in accordance with certain embodiments described herein for simultaneously managing a plurality of messages.

The device DEV may be a telephone, a smartphone, or a tablet.

The device DEV has a message management module MM.

This message management module MINI itself comprises three modules.

The first module CREA serves to create dynamically a zone Z1 associated with or for associating with a message M1 that is to be sent, in the container CONT.

The module SEL enables the previously created zone Z1 to be selected.

The module EDIT enables the message M1 in the previously selected zone Z1 to be edited.

The device DEV also has an interface INT suitable for displaying the application performing the method, and which may also be a touch interface enabling the user to interact with the application, by creating zones, by editing them, or by sending the messages associated with those zones, by using one or more pointers such as a stylus or a finger.

Finally, the device DEV has a data medium DATA storing a program PG containing instructions for performing the method.

Figure 8:
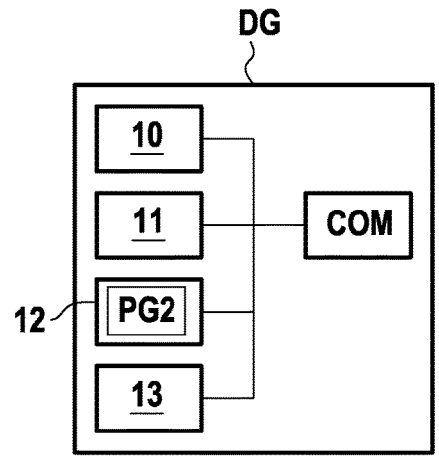

In the presently-described embodiment, the management device DEV has the hardware architecture of a computer, as shown diagrammatically in FIG. 8.

The management device DEV thus comprises a processor 10, a rewritable non-volatile memory 11, a read only memory (ROM) 12, a random access memory (RAM) 13, and a communications module COM.

The ROM 12 of the management device DEV constitutes a data medium in accordance with certain embodiments described herein that is readable by the processor 10 and that stores a computer program PG2 in accordance with certain embodiments described herein including instructions for executing steps of a method for managing a plurality of messages, which steps are described in detail with reference to FIGS. 1 and 2.

What is claimed is:

1. A method of managing messages in a messaging application providing a container with a first input zone for a first message associated with a thread of a conversation between at least two users, the method comprising:
    dynamically creating, in the same container, a second input zone associated with a second message associated with the same thread of the conversation, the container having a plurality of input zones, each input zone dedicated to a respective message and allowing the respective message to be edited therein;
    selecting the dynamically created second input zone, wherein selecting the dynamically created second input zone comprises:
        scrolling the input zones in the container, wherein scrolling the input zones in the container corresponds to successively displaying each of the input zones in the container, each displayed input zone occupying the entire container when displayed, with a following input zone being displayed:
            in response to at least one pointer tapping at least one button of an interface; or
            in response to at least one pointer double-tapping on the container, and
        stopping on the created second input zone to be selected;
    editing the second message associated with the selected second input zone in the selected second input zone; and
    sending the edited second message to its at least one destination, wherein sending the second message to its at least one destination causes the content of the selected second input zone to be deleted, the content of the first input zone of the container remaining unchanged.

2. The method of claim 1, wherein dynamically creating a second input zone and selecting said created second input zone associated with the second message take place simultaneously.

3. The method of claim 1, wherein dynamically creating the second input zone associated with the second message in the container is performed:
    as a result of an action of at least one pointer on an interface; or
    automatically, on opening the messaging application performing the method.

4. The method of claim 3, wherein the pointer comprises a finger or a stylus.

5. The method of claim 1, additionally comprising destroying at least one zone, said destruction being performed:
    as a result of an action of at least one pointer on an interface;
    automatically, on sending a message associated with the zone; or
    automatically, on closing the messaging application implementing the method.

6. The method of claim 1, wherein scrolling the input zones in the container corresponds to shifting the input zones in the container, the shifting being performed by a sliding movement of at least one pointer on the container.

7. The method of claim 6, wherein the shifting is performed in the inputting direction.

8. The method of claim 1, wherein stopping on the created second input zone is performed:
    in response to at least one pointer tapping said created second input zone at least once;
    automatically, when said created second input zone occupies at least a majority of said container; or
    automatically, when said created second input zone occupies the entire container.

9. A device for managing messages in a messaging application providing a container with a first input zone for a first message associated with a thread of a conversation between at least two users, the device comprising a processor, the device configured to:
    dynamically create, in the same container, a second input zone associated with a second message associated with the same thread of the conversation, the container having a plurality of input zones, each input zone dedicated to a respective message and allowing the respective message to be edited therein;
    select the dynamically created second input zone, wherein selecting the dynamically created second input zone comprises scrolling the input zones in the container, and stopping on the created second input zone to be selected; wherein scrolling the input zones in the container corresponds to successively displaying each of the input zones in the container, each displayed input zone occupying the entire container when displayed, with a following input zone being displayed:
        in response to at least one pointer tapping at least one button of an interface; or
        in response to at least one pointer double-tapping on the container; and
    edit the second message associated with the selected second input zone in the selected second input zone; and
    send the edited second message to its at least one destination, wherein the sending of the second message to its at least one destination causes the content of the selected input second zone to be deleted, the contents of the first input zone of the container remaining unchanged.

10. The device of claim 9, wherein the device comprises at least one memory.

11. A computer having stored thereon instructions which, when executed by the computer, cause the computer to perform a method for managing messages in a messaging application providing a container with a first input zone for a first message associated with a thread of a conversation between at least two users, the method comprising:
    dynamically creating, in the same container, a second input zone associated with a second message associated with the same thread of the conversation, the container having a plurality of input zones, each input zone dedicated to a respective message and allowing the respective message to be edited therein;
    selecting the dynamically created second input zone, wherein selecting the dynamically created second input zone comprises:
        scrolling the input zones in the container, wherein scrolling the input zones in the container corresponds to successively displaying each of the input zones in the container, each displayed input zone occupying the entire container when displayed, with a following input zone being displayed:
            in response to at least one pointer tapping at least one button of an interface; or in response to at least one pointer double-tapping on the container; and stopping on the created second input zone to be selected;

editing the second message associated with the selected second input zone in the selected second input zone and sending the edited second message to its at least one destination, wherein sending the second message to its at least one destination causes the content of the selected second input zone to be deleted, the content of the first input zone of the container remaining unchanged.

12. A non-transitory computer-readable data medium having stored thereon instructions which, when executed by a processor, cause the processor to perform a method for managing messages in a messaging application providing a container with a first input zone for a first message associated with a thread of a conversation between at least two users, the method comprising:

dynamically creating, in the same container, a second input zone associated with a second message associated with the same thread of the conversation, the container having a plurality of input zones, each input zone dedicated to a respective message and allowing the respective message to be edited therein;

selecting the dynamically created second input zone, wherein selecting the dynamically created second input zone comprises:

scrolling the input zones in the container, wherein scrolling the input zones in the container corresponds to successively displaying each of the input zones in the container, each displayed input zone occupying the entire container when displayed, with a following input zone being displayed:

in response to at least one pointer tapping at least one button of an interface; or in response to at least one pointer double-tapping on the container; and stopping on the created second input zone to be selected;

editing the second message associated with the selected second input zone in the selected second input zone and sending the edited second message to its at least one destination, wherein sending the second message to its at least one destination causes the content of the selected second input zone to be deleted, the content of the first input zone of the container remaining unchanged.

\* \* \* \* \*